(12) United States Patent
Jerman

(10) Patent No.: US 7,079,346 B2
(45) Date of Patent: Jul. 18, 2006

(54) DATA STORAGE METHODS AND APPARATUS

(75) Inventor: Steve Jerman, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 766 days.

(21) Appl. No.: 09/881,778

(22) Filed: Jun. 14, 2001

(65) Prior Publication Data

US 2002/0191322 A1    Dec. 19, 2002

(51) Int. Cl.
*G11B 15/18*    (2006.01)
(52) U.S. Cl. ..................................... 360/69
(58) Field of Classification Search .............. 360/69, 360/70, 71, 72.2, 48, 72.1, 31, 92, 84, 93, 360/90, 91; 369/30.29; 710/20; 705/408
See application file for complete search history.

(56) References Cited

U.S. PATENT DOCUMENTS

| | | | | |
|---|---|---|---|---|
| 4,864,438 A * | 9/1989 | Munro | ................ | 360/92 |
| 4,945,429 A * | 7/1990 | Munro et al. | .............. | 360/92 |
| 5,132,949 A | 7/1992 | Choi | | |
| 5,325,370 A * | 6/1994 | Cleveland et al. | .......... | 714/755 |
| 5,369,532 A * | 11/1994 | Dodt et al. | .................. | 360/48 |
| 5,369,641 A * | 11/1994 | Dodt et al. | ................. | 714/702 |
| 5,429,470 A * | 7/1995 | Nicol et al. | ............ | 414/331.05 |
| 5,455,409 A * | 10/1995 | Smith et al. | ................ | 235/385 |
| 5,456,569 A * | 10/1995 | Cheatham et al. | ....... | 414/744.3 |
| 5,487,171 A * | 1/1996 | Dodt et al. | ................... | 710/20 |
| 5,526,198 A * | 6/1996 | Dodt et al. | ................... | 360/48 |
| 5,546,246 A * | 8/1996 | Klomp et al. | .............. | 360/72.2 |
| 5,571,304 A * | 11/1996 | Ritter et al. | ................. | 75/246 |
| 5,576,903 A * | 11/1996 | Brown et al. | ................ | 360/48 |
| 5,625,517 A | 4/1997 | Sawada et al. | | |
| 5,741,459 A * | 4/1998 | Ando et al. | ................. | 264/293 |
| 5,786,955 A * | 7/1998 | Kori et al. | ................. | 360/72.1 |
| 5,848,401 A * | 12/1998 | Goldberg et al. | .......... | 705/408 |
| 5,867,335 A * | 2/1999 | Ozue et al. | .................. | 360/71 |
| 5,878,668 A * | 3/1999 | Ando et al. | ................. | 101/379 |
| 6,038,200 A * | 3/2000 | Ozue et al. | ............. | 369/30.29 |
| 6,172,833 B1 * | 1/2001 | Fry et al. | ...................... | 360/71 |
| 6,327,109 B1 * | 12/2001 | Kori et al. | ................. | 360/72.1 |
| 6,417,977 B1 * | 7/2002 | Ohta et al. | .................... | 360/31 |
| 6,571,304 B1 * | 5/2003 | Basham et al. | .............. | 710/53 |
| 6,674,599 B1 * | 1/2004 | Rae et al. | ................. | 360/72.1 |
| 6,710,962 B1 * | 3/2004 | Caverly et al. | .............. | 360/69 |

FOREIGN PATENT DOCUMENTS

| | | |
|---|---|---|
| BE | 885102 | 12/1980 |
| GB | 2083440 | 3/1982 |
| JP | 9171673 | 6/1997 |
| JP | 2000200472 | 7/2000 |
| WO | WO 89/10615 | 11/1989 |

* cited by examiner

*Primary Examiner*—Fred F. Tzeng

(57) ABSTRACT

Methods and apparatus for storing data. An apparatus in accordance with the present invention includes a tape cartridge which has a cartridge memory. The cartridge memory can store therein a set of label data and a cartridge stamp. The set of label data is read by a reader device only when the reader device, in conjunction with a controller, determines that the cartridge stamp has been updated. Methods in accordance with the present invention comprise steps of reading the set of label data if the cartridge stamp is determined to have been updated.

18 Claims, 4 Drawing Sheets

DATA STORAGE METHODS AND APPARATUS

FIELD OF THE INVENTION

This invention pertains to methods and apparatus for storing data, and more specifically to data storage methods and apparatus which employ a tape cartridge having a cartridge memory.

BACKGROUND OF THE INVENTION

Prior art magnetic tape data storage is typically used for data backup, data archiving, and/or data processing purposes. In the art, magnetic tape media is known as a convenient, cost-effective means of storing large quantities of data. Often, magnetic tape media is employed in the form of tape cartridges (sometimes referred to as tape cassettes). Tape cartridges generally comprise a length of tape media which is supported on at least one reel which, in turn, is rotatably enclosed in an outer casing. The tape cartridge configuration allows convenient handling and storage of the tape media. Additionally, the tape cartridge configuration facilitates automated handling of the tape.

Modern magnetic data storage tape handling systems typically include a plurality of tape drives as well as an automated data storage library. Each of the tape drives is configured as a sub-system which is configured to read data from, and/or write data to, the magnetic tape. The automated data storage library typically includes a storage rack or the like having a plurality of storage slots or the like for supporting a large number of tape cartridges. The data storage library also typically includes a robotic accessor such as a picker arm or the like which is configured to move tape cartridges from the respective storage slots to a given tape drive. Additionally, typical libraries often include at least one reader which is configured to read the contents of the cartridge memory.

An example of a typical tape handling system which includes a plurality of tape drives as well as an automated data storage library is disclosed in U.S. Pat. No. 6,172,833 B1 to Fry et al, and which is incorporated herein by reference. A similar tape handling system is available from the Hewlett-Packard Company of Palo Alto, Calif. The tape drives of such tape handling systems are typically configured to be in signal communication with data processing equipment or the like which generates and/or processes data. Data processing equipment can include, for example, large mainframe computers or the like, or local area networks comprising a plurality of PC's or workstation computers.

Typically, data is sent to, and/or requested from, the data storage handling system by the data processing equipment. That is, the data processing equipment alternatively either sends data to the tape handling system to be written to a tape, or requests that the tape handling system retrieve certain data from a given tape. The data storage handling system then carries out commands issued by the data processing equipment by either writing data to, or retrieving data from, the appropriate tape cartridge.

As disclosed by Fry et al, tape cartridges which are configured to be used in conjunction with the tape handling systems such as those discussed above, typically comprise a memory device such as a memory circuit or the like, which is mounted on the casing of the tape cartridge. Such a memory device is often referred to as a "cartridge memory." The cartridge memory typically comprises a memory circuit module, such as an EPROM semiconductor memory chip, which is mounted on a circuit board or the like.

The cartridge memory, although relatively small, can be used for storing many types of information such as condensed versions of block maps or indexes of the data stored on the associated magnetic storage tape. However, the cartridge memory is typically employed to store "label information" regarding the associated tape cartridge. Label information can include, for example, the serial number of the tape cartridge and the type or category of data stored on the tape cartridge. In many cases, when a given tape cartridge is accessed by a tape drive so as to have data written thereto, the tape drive updates some of the information which is stored in the cartridge memory of the given tape cartridge.

The data storage library also typically conducts "inventories" of each of the tape cartridges by sequentially accessing and reading the entire contents of the cartridge memory of each of the tape cartridges. This is often performed by the automated picker arm of the data storage library. One of the purposes of such an inventory is to ensure that the data contained in each of the cartridge memories is also contained in the memory of the data storage library.

That is, the data storage library includes a memory which is configured to store the information which is contained in each of the cartridge memories. This allows the data storage library to display the information on a display screen, and/or allows the data storage library to make such information available to the data processing equipment. For example, the data processing equipment can query the data storage library asking if a given tape cartridge is available.

However, the process performed by the library, wherein the process comprises reading the entirety of each of the cartridge memories, can require a considerable amount of time and processing resources. What is needed then, are methods and apparatus which achieve the benefits to be derived from similar prior art devices, but which avoid the shortcomings and detriments individually associated therewith.

SUMMARY OF THE INVENTION

The invention includes methods and apparatus for storing data, wherein such methods and apparatus employ a tape cartridge having a cartridge memory.

In accordance with a first embodiment of the present invention, a data storage apparatus comprises a tape cartridge having a cartridge memory which is configured to store therein a set of label data and a cartridge stamp. The data storage apparatus also comprises a first controller which is configured to execute a sequence of computer-executable steps to update the set of label data and to update the cartridge stamp in response to updating the set of label data.

In accordance with a second embodiment of the present invention, a method of data storage employing a tape cartridge having a cartridge memory comprises storing a cartridge stamp in the cartridge memory and determining if the cartridge stamp has been updated.

In accordance with a third embodiment of the present invention, a method of data storage employs a tape cartridge which has a length of tape media with a set of general data stored thereon, and which has a cartridge memory as well. The method comprises storing a cartridge stamp in the cartridge memory, updating the set of general data, and updating the cartridge stamp in response to updating the set of general data.

In accordance with a fourth embodiment of the present invention, a method of data storage employs a tape cartridge which has a cartridge memory with a set of label data stored therein, and which has a length of tape media with a set of general data stored thereon. The method comprises storing a cartridge stamp in the cartridge memory and replacing the set of label data stored in the cartridge memory with an updated set of label data. The method also comprises replacing the cartridge stamp stored in the cartridge memory with an updated cartridge stamp in response to replacing the set of label data.

DETAILED DESCRIPTION OF THE INVENTION

The invention includes methods and apparatus for storing data. The methods and apparatus of the present invention feature the use of a tape cartridge which has a cartridge memory. A cartridge stamp is stored in the cartridge memory along with a set of label data. The cartridge stamp is updated in response to a given event which includes an update of the set of label data. In this manner, the efficiency of an inventory process can be increased, wherein the inventory process comprises reading the sets of label data of a plurality of tape cartridges. The efficiency of the inventory process is increased by using the cartridge stamp to indicate when the corresponding set of label data has been updated since a previous reading, and therefore, to indicate when the set of label data should be read.

Figure 1:
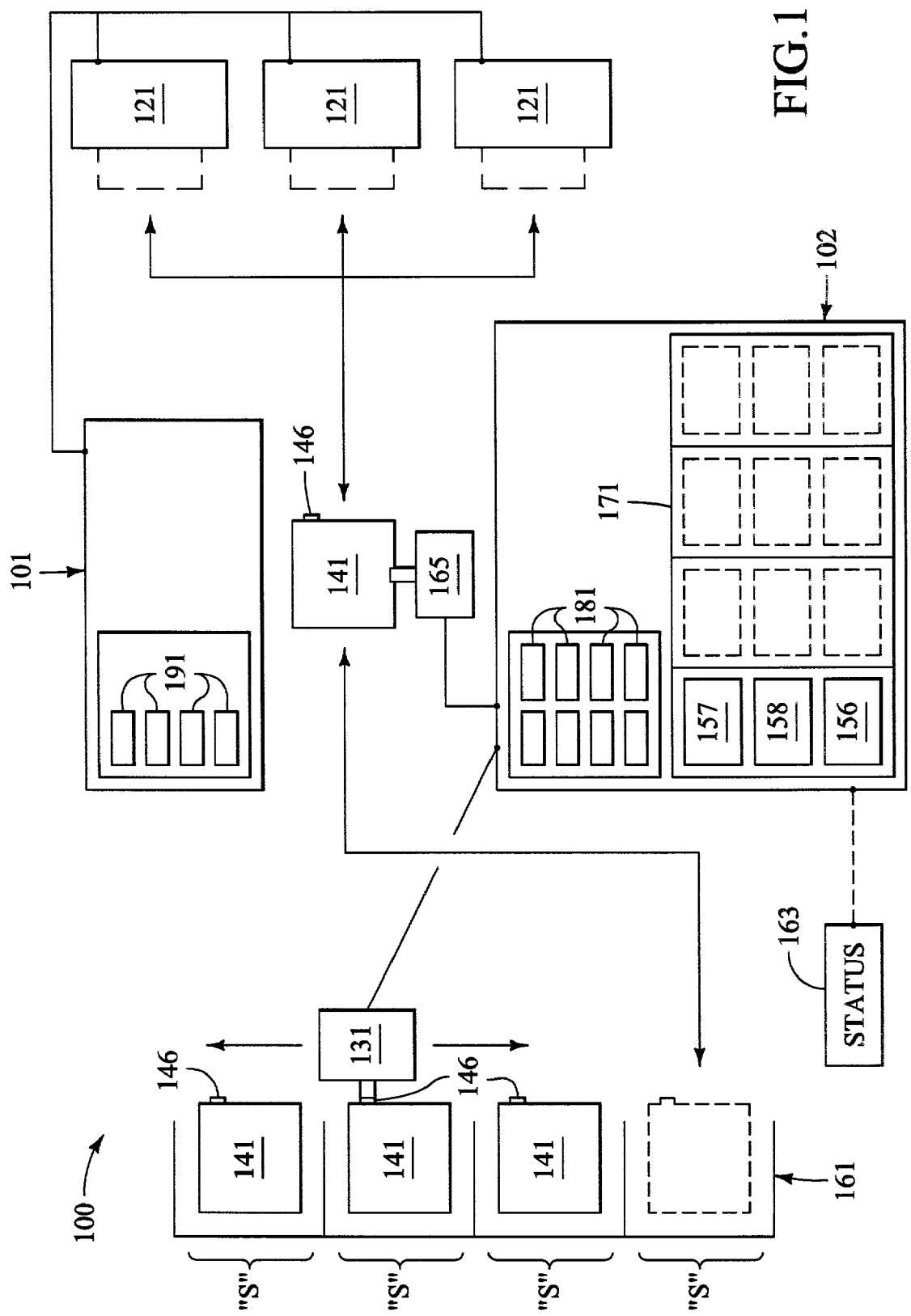
FIG. 1 is a schematic diagram of an apparatus in accordance with a first embodiment of the present invention.

Turning now to FIG. 1, a schematic diagram is shown which depicts a data storage apparatus 100 in accordance with a first embodiment of the present invention. The apparatus comprises a first controller 101 which is in signal communication with at least one tape drive 121. The configuration of the first controller 101 as well as that of the tape drive 121 will be discussed in further detail below. Tape drives are known in the art and are utilized to read and/or write data.

The apparatus 100 can also comprise a second controller 102 which is in signal communication with a reader device 131. The second controller 102 can also be in signal communication with a display screen 163 as well as a robotic tape picker 165. As is evident, the apparatus 100 also comprises at least one tape cartridge 141. Preferably, the apparatus 100 comprises a plurality of tape cartridges 141. Each tape cartridge 141 is configured to be stored in a tape storage device 161 which defines a plurality of slots "S" or the like for supporting the tape cartridges.

Figure 2:
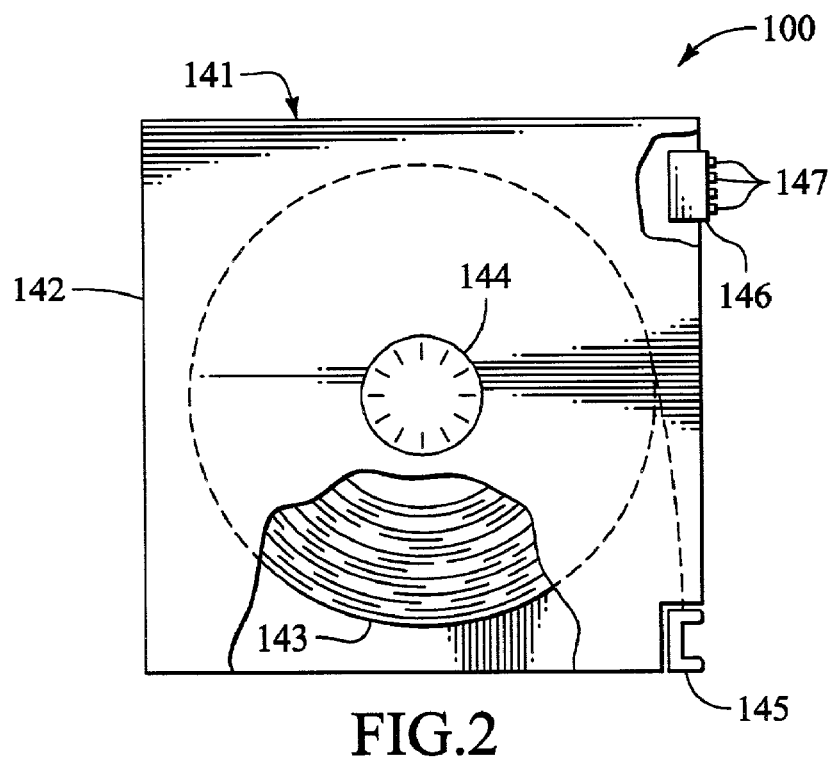
FIG. 2 is a top view of a tape cartridge in accordance with the first embodiment of the present invention.

Turning briefly to FIG. 2, a top view is shown which depicts a tape cartridge 141 in accordance with the first embodiment of the present invention. The tape cartridge 141 can comprise an outer casing 142 or the like which serves as a structural enclosure for other components of the tape cartridge. The tape cartridge 141 comprises a length of tape media 143, such as magnetic tape or the like.

The length of tape media 143 is configured to be selectively and repeatably coiled about, and uncoiled from, a reel or spool 144 which is rotatably supported within the casing 142. The tape cartridge 141 also typically includes a leader device 145 which is connected to one end of the length of tape media 143. The leader device 145 is configured to allow the length of tape media 143 to be automatically uncoiled and withdrawn from the casing 142 by a tape drive or the like (not shown) to facilitate reading data from, and/or writing data to, the tape media.

As is evident, the tape cartridge 141 also comprises a cartridge memory 146 which is preferably rigidly supported on the casing 142. The cartridge memory 146 can include a memory circuit module (not shown) such as a semiconductor memory chip, a rewritable magnetic chip, or the like. A series of electrical conductor terminals 147 can be connected to the cartridge memory 146 so as to provide high speed electronic access to the contents of the cartridge memory by other devices such as the tape drives 121 and the reader device 131. The cartridge memory 146 can also be accessed by wireless techniques, such as by using infrared or radio frequency transmissions.

Figure 3:
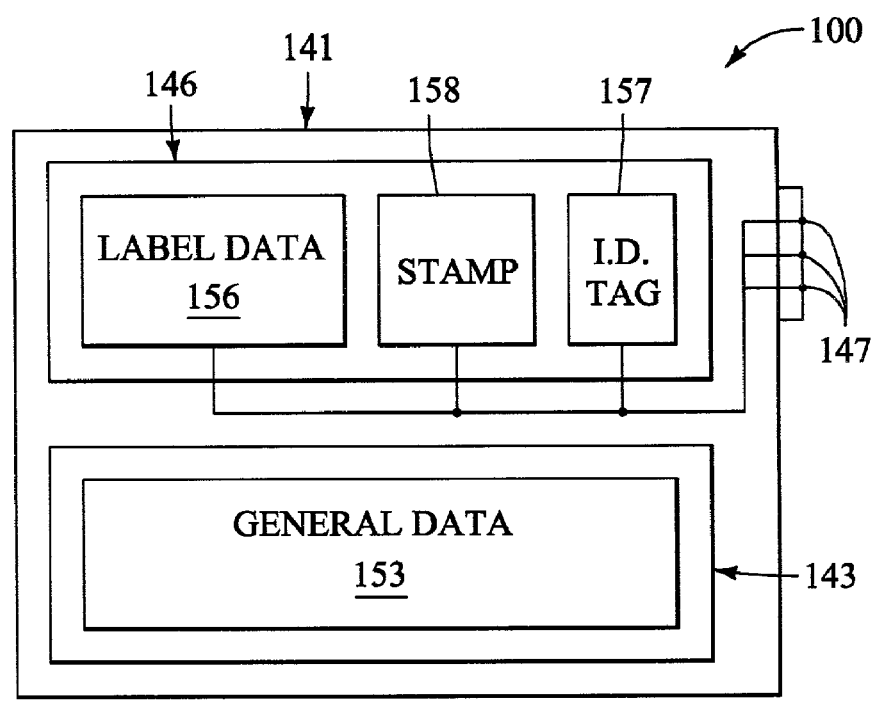
FIG. 3 is a schematic diagram of the tape cartridge which is depicted in FIG. 2.

Moving now to FIG. 3, a schematic diagram is shown which schematically depicts the tape cartridge 141 which is shown in FIG. 2. As shown in FIG. 3, the tape media 143 is configured to store thereon at least one set of general data 153. When I say "general data" I mean data which the storage thereof is the primary purpose of the apparatus 100, and from which is excluded any other data which is specifically defined herein.

As is also seen, the cartridge memory 146 is configured to store therein a set of label data 156. When I say "label data" I mean data that is specifically associated with the given tape cartridge 141 on which the cartridge memory 146 containing the set of label data 156 is supported. That is, label data is data that would normally be written on a paper label or the like which would be affixed to the tape cartridge 141. Label data can include, for example, the date that the tape cartridge 141 was put into service, as well as an index of the set of general data 153, and a block map or the like which describes the storage configuration of the set of general data on the length of tape media 143. It is noted that general data does not include label data.

The cartridge memory 146 is preferably also configured to store therein a cartridge identification tag 157. When I say "cartridge identification tag" I mean at least one character of data which can be read by at least the reader 131 and preferably by each of the tape drives 121. The cartridge identification tag 157 serves to identify the specific tape cartridge 141 which supports the cartridge memory 146 in which the cartridge identification tag is stored. The cartridge identification tag 157 can be, for example, the serial number of the tape cartridge 141.

The cartridge memory 146 is configured to store therein a cartridge stamp 158. When I say "cartridge stamp" I mean at least one character of data which can be read by the reader 131 and which can be overwritten, or updated, by each of the tape drives 121. The cartridge stamp 158 is employed to indicate that the label data 156 should be read by the reader 131. The nature and function of the cartridge stamp 158 will become more apparent as the cartridge stamp is discussed in greater detail below. As is evident, the set of label data 156, the cartridge stamp 158, and the identification tag 157 can be accessed by way of the terminals 147 by both the reader 131 and each of the tape drives 121.

Returning now to FIG. 1, it is apparent that each of the tape cartridges 141 is configured to be moved from a supported position in a respective slot "S" of a support device 161 to a respective tape drive 121. Such movement of the individual tape cartridges 141 can be performed by a robotic gripper arm device 165 or the like which is configured to automatically move the tape cartridges as described. Alternatively, any or all of the tape cartridges 141 can be moved manually between the support device 161 and a respective tape drive 121. The configuration and operation of the robotic gripper arm device 165, as well as those of similar devices, are known in the art and are more fully described in the incorporated reference by Fry et al.

As a study of FIG. 1 reveals, the second controller 102 preferably comprises a reader memory 171 which is configured to store sets of data therein. More specifically, the reader memory 171 is preferably configured to store therein the identification tag 157, and the cartridge stamp 158, of each of a plurality of tape cartridges 141. The reader memory is also preferably configured to store therein the set of label data 156 for each of the tape cartridges 141 which are included in the apparatus 100.

The reader memory 171 is configured to associate the identification tag 157 of a given tape cartridge 141 with the respective cartridge stamp 158, as well as with the respective set of label data 156 which correspond to the given tape cartridge. Thus, preferably, the identification tag 157, as well as the cartridge stamp 158 and the set of label data 156 for each tape cartridge 141 are stored both in the respective cartridge memory 146 and in the reader memory 171. When stored in either the cartridge memory 146 or the reader memory 171, the respective cartridge identification tag 157, cartridge stamp 158, and set of label data for each tape cartridge 141 are correspondingly linked so as to be associated with one another.

The identification tag 157, as well as the cartridge stamp 158 and the set of label data 156, of each of the tape cartridges 141 can be loaded into the reader memory by way of the reader device 131. That is, the reader device 131 is configured to move relative to the tape cartridges 141 so as to connect to the terminals 147 of the cartridge memory 146 of each tape cartridge in order to be in signal communication therewith. While in signal communication with a given cartridge memory 146, the reader device 131 can read the contents of the respective cartridge memory which are stored thereon.

That is, the reader 131 can connect with the respective terminals 147 of each tape cartridge so as to read the cartridge memory thereof, in a consecutive order. Alternatively, the reader can employ a wireless technique to read the cartridge memory, such as infrared, radio frequency identification ("RFID"), or the recently developed Bluetooth short range wireless communication protocol. (Bluetooth is a trademark of Telefonaktiebolaget LM Ericsson Corporation, Sweden.)

In other words, the reader device 131 can selectively read the respective identification tag 157, as well as the respective cartridge stamp 158 and respective set of label data 156, of each of the tape cartridges 141 one-by-one. The reader device 131 can send signals containing the identification tag 157, as well as the cartridge stamp 158 and set of label data 156, of each of the tape cartridges 141 to the second controller 102 to be stored in the reader memory 171.

It is often beneficial for the reader 131 to conduct an inventory process of the cartridge memory 146 of each of the tape cartridges 141 on a periodic basis. Such an inventory process comprises reading at least a portion of each of the cartridge memories 146 of the tape cartridges 141 to ensure that the corresponding data stored in the reader memory 171 is current. The data stored in the reader memory 171 can be displayed on the display screen 163 so as to be made available to an operator (not shown) or the like which can allow the operator to be aware of the status of the tape cartridges 141.

As discussed above, each of the tape cartridges 141 can be inserted into any of the tape drives 121. One of the functions of the tape drives 121 is to read, and/or write to, the length of tape media 143 (FIG. 3) of any of the tape cartridges 141. That is, any of the tape drives 121 can read any portion of the set of general data 153 which is stored on the length of tape media 143 of any given tape cartridge 141.

Any of the tape drives 141 can also write to the tape media 143 by updating the set of general data. That is, any of the tape drives 121 can create an updated set of general data 153 by writing new data to the tape media 143. New data can include additional data or replacement data which replaces old data. Likewise, each of the tape drives 121 are configured to write to the cartridge memory 146 (FIG. 3) so as to update the set of label data 156 (FIG. 3), and to update the cartridge stamp 158 (FIG. 3), which are stored in the cartridge memory. That is, any of the tape drives 121 is configured to update the label data 156, and also configured to update the cartridge stamp 158.

As discussed above, the set of label data 156 can include such information as the number of times the set of general data is read, as well as an index of the set of general data and a block map thereof, among other information. Therefore, if a given tape drive 121 reads the set of general data 153 of a given tape cartridge, then the set of label data 156 can be updated substantially simultaneously by the given tape drive to reflect, for example, the performance of an additional reading of the set of general data of the given tape cartridge by the tape drive. Alternatively, if the set of general data 153 of a given tape cartridge 141 is updated by one of the tape drives 121, then the set of label data 156 can also be updated substantially simultaneously by that tape drive to reflect, for example, an update of the data index or an update of the block map. By "substantially simultaneously" I mean during the same session.

As is seen, the first controller 101 is configured to be capable of executing a sequence of computer-executable steps 191 to replace the set of label data 156 with a set of updated label data. This can be done as a result of simply reading the tape media 143 as described above, or in the alternative, as a result of updating the set of general data 153 as also described above. That is, the computer-executable steps 191 can be executed by the first controller 101 to update the set of label data 156 of a given tape cartridge 141 either in response to a reading of the set of general data 153 performed by a tape drive 121, or in response to an updating of the set of general data 153 (FIG. 3) performed by a tape drive.

In addition, the cartridge stamp 158 (FIG. 3) is updated in response to updating the set of label data 156 (FIG. 3). The cartridge stamp 158 can be described as an indicator for indicating whether the set of label data 156 has been updated. This description of the cartridge stamp 158 will be more apparent in later discussion. The set of computer-executable instructions 191 can thus be executed by the first controller 101 to update the cartridge stamp 158 in response to updating the set of label data 156.

The cartridge stamp 158 can be configured in any of a number of manners. For example, the cartridge stamp 158 can toggle between either one of a first data character or a second data character. The first data character can be a zero (0) for example, and the second data character can be a one (1). It is assumed for illustrative purposes that the cartridge stamp is initially set to be a data character of zero (0). The cartridge stamp 158 is read a first time, wherein the cartridge stamp is detected to be set at zero (0).

The cartridge stamp 158 can then read a second time, wherein the cartridge stamp is again detected to be a zero (0). The fact that the cartridge stamp 158 does not change between the first reading and the second reading thereof indicates that the set of label data 156 has not been updated. When the set of label data is updated a first time, the cartridge stamp 158 is changed from a zero (0) to a one (1). The cartridge stamp 158 can then be read a third time, wherein a change is detected in the cartridge stamp 158 between the second reading and the third reading thereof.

Thus, the change in the cartridge stamp 158 between the second reading and the third reading thereof indicates that the set of label data 153 has been updated. When the set of label data 153 is updated a second time, the cartridge stamp 158 is changed from a one (1) back to a zero (0). Thus, the change of the cartridge stamp 158 from a one (1) to a zero (0) indicates a further update of the set of label data 153. The relevance of the use of the cartridge stamp 158 as an indicator as described above will become apparent in the discussion below.

The cartridge stamp 158 can alternatively be configured to be updated in accordance with a pre-determined pattern. For example, the cartridge stamp 158 can be initially set at a value of one (1). When the cartridge stamp 158 is updated a first time, the cartridge stamp can be changed to a value of two (2). Similarly, when the cartridge stamp 158 is updated a third time, the cartridge stamp can be changed to a value of three (3). Thus, such a pre-determined pattern of incrementally updating the value of the cartridge stamp 158 can continue indefinitely. As is evident, then, the cartridge stamp 158 can comprise a sequentially selected character.

Alternatively, the cartridge stamp 158 can comprise a randomly selected character. For example, the set of computer-executable steps 191 can include steps to randomly generate a number or other character which can serve as the cartridge stamp 158 for a given tape cartridge 141. Each time the cartridge stamp 158 is updated, a new randomly generated character is written over the previous character. A random character generator (not shown) which can be included in the first controller 101 can be used to generate the cartridge stamp in this case.

More preferably, the value of the cartridge stamp 158 can be a time/date stamp. That is, the value of the cartridge stamp 158 can be set at the real time and date at which the cartridge stamp is updated. For example, if the cartridge stamp 158 is updated at noon on the first day of June in the year 2003, then the value of the cartridge stamp 158 can be set at 120006012003. A real time clock (not shown) which can be included in the first controller 101 can be used to generate the cartridge stamp 158 is this case.

In this example, the first four characters of the cartridge stamp 158 represent noon (1200). Likewise, the fifth and sixth characters represent the month of June (06). Similarly, seventh and eighth characters represent the first day of the month (01). The last four characters represent the year (2003). In this manner, the cartridge stamp 158 can be used for additional purposes such as indicating the date and time of the last update to the set of label data 156. As is seen, the cartridge stamp 158 can comprise a real time stamp.

As also revealed by a study of FIG. 1, the second controller 102 is configured to execute a sequence of computer-executable steps 181. The set of computer-executable steps 181 can be performed by the second controller 102 to read the cartridge stamp 158 (FIG. 3) from the cartridge memory 146 (FIG. 3) during a first reading. That is, the cartridge stamp 158 can be caused to be read a first time. The first reading of the cartridge stamp 158 can be performed, for example, by the reader device 131 of the apparatus 100.

The computer-executable steps 181 can also be executed by the second controller 102 to read the cartridge stamp 158 during a second reading thereof. That is, the cartridge stamp 158 can be caused to be read a second time. The second reading of the cartridge stamp 158 can also be performed by the reading device 131, for example. The computer-executable steps 181 can be executed by the second controller 102 to determine whether the cartridge stamp 158 has changed between the first reading and the second reading.

That is, the computer-executable steps 181 can be executed by the second controller 102 to determine whether the cartridge stamp 158 has been updated between the first reading thereof and the second reading thereof. This determination can be made, for example, by storing the first reading of cartridge stamp 158 in the reader memory 171. Then, when the second reading of the cartridge stamp 158 is performed, the second reading can be compared to the first reading which is stored in the reader memory. Such a comparison can yield a determination as to whether the cartridge stamp 158 has been updated between the first reading and the second reading.

The set of computer-executable steps 181 can be executed by the second controller 102 in order to read the set of label data 156 in response to determining that the cartridge stamp 158 has been updated between the first reading and the second reading thereof. That is, if the cartridge stamp 158 has been determined to have been updated between the first and second readings thereof, then the set of label data 156 is read in response. The label data 156 can be read, for example, by the reader device 131.

On the other hand, if the cartridge stamp 158 is found not to have been updated between the first and the second readings thereof, then the set of label data 156 is not read. The second controller 102 can be configured to execute an additional computer-executable steps 181 to store the updated set of label data 156 in the reader memory 171 in response to determining that the cartridge stamp 158 has been updated between the first and second readings thereof.

Thus, in summary, the apparatus 100 can be configured to cause a tape drive 121 to update a cartridge stamp 158 of a given tape cartridge in response to updating a corresponding set of label data 153. The reader device 131, in conjunction with the second controller 102, can operate independently of any of the tape drives 121 to read the cartridge stamp 158 of the given tape cartridge 141 a first time. After a predetermined interval of time, for example, the reader device 131 then reads the cartridge stamp 158 of the given tape cartridge 141 a second time. The second controller 102 then detects whether the cartridge stamp 158 has been updated between the first reading and second reading thereof.

If the cartridge stamp 158 has not been updated between the first and second readings, then the set of label data 156 is not read by the reader device 131. If the cartridge stamp 158 has been updated between the first and second readings, then the reader device 131 reads the label data 156. Furthermore, the updated set of label data 153, as well as the updated cartridge stamp 158, are stored in the reader memory 171, overwriting the previously stored set of label data and cartridge stamp.

As is evident, the utilization of an apparatus such as the apparatus 100, wherein a cartridge stamp 158 is employed therewith in the manner described herein, can significantly reduce the quantity of time and processing resources required to perform an inventory of a large number of tape cartridges 141, wherein such an inventory is performed by a reading device such as the reading device 131 of the apparatus 100, and wherein such an inventory comprises consecutively reading at least a portion of the contents of each cartridge memory to ensure that the sets of label data 156 stored in the reader memory 171 are current.

The reduction in the quantity of time and processing resources is the result of the elimination of redundant readings of sets of label data which have not been updated. That is, a reading of a cartridge stamp 158 can be performed significantly more quickly than a reading of an entire set of corresponding label data 156. An initial reading of a given cartridge stamp 158 can indicate whether the corresponding set of label data 153 has been updated since the last reading thereof, and thus can indicate whether the corresponding set of label data needs to be read, thereby eliminating redundant readings of sets of label data.

Figure 4:
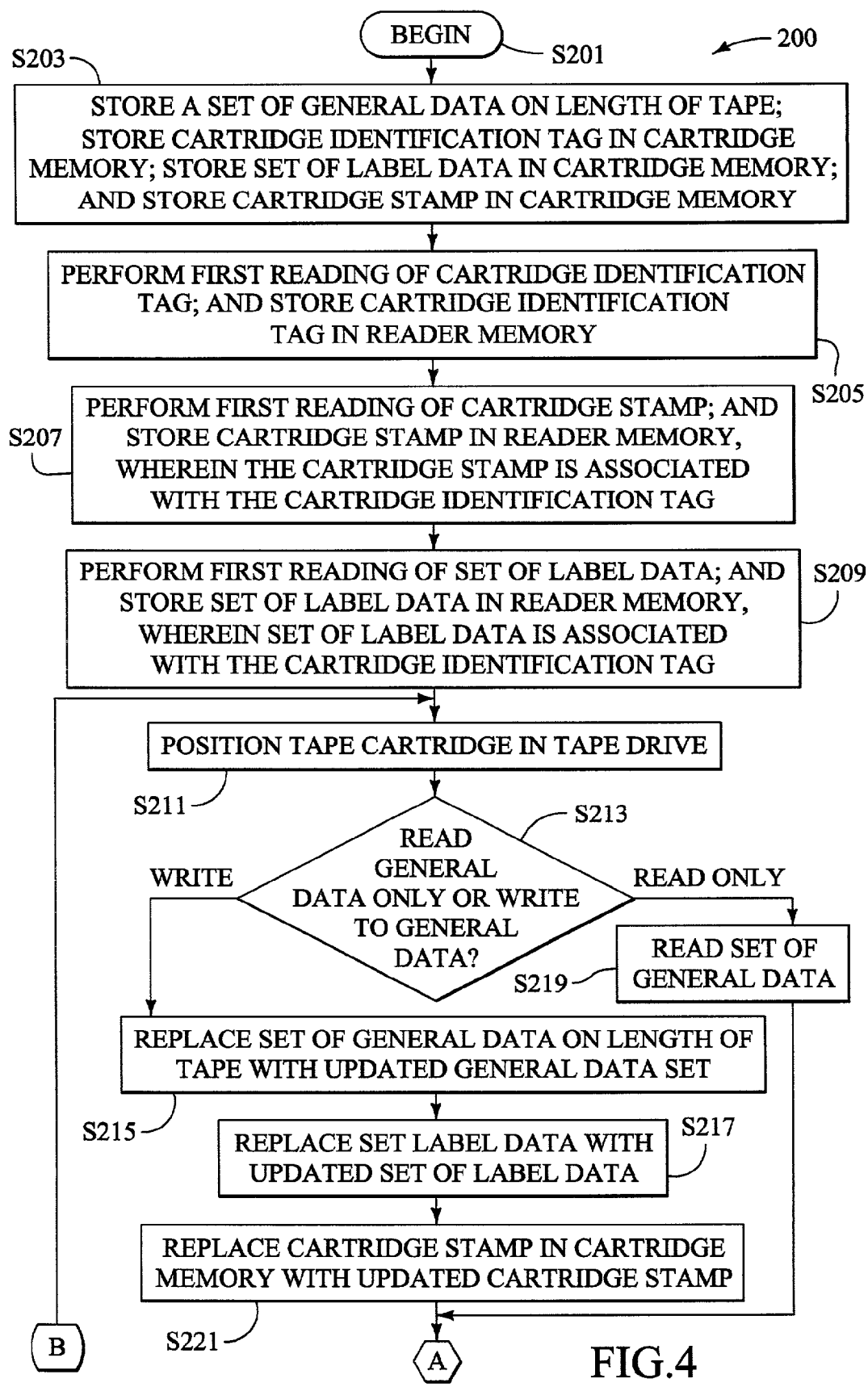
FIG. 4 is a first portion of a flow chart which depicts a series of steps that can be performed by the apparatus in accordance with the first embodiment of the present invention which is depicted in FIG. 1.
Figure 5:
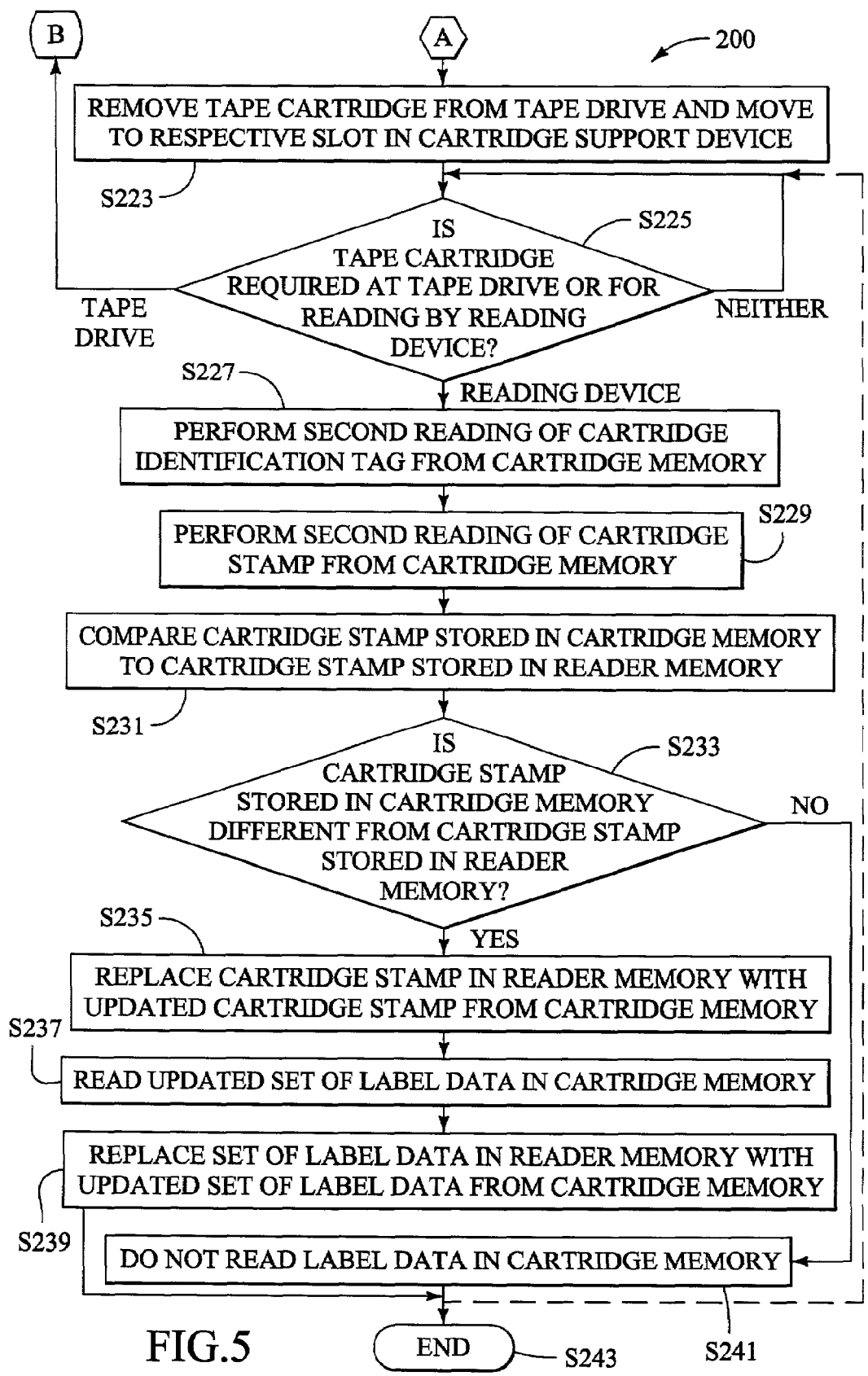
FIG. 5 is a second portion of the flow chart of which the first portion is shown in FIG. 4.

Now moving to FIG. 4, a first portion of a flow chart 200 is shown which depicts a set of steps which can be performed by the apparatus 100 which is described above and shown in FIGS. 1 through 3. A second portion of the flow chart 200 is shown in FIG. 5. The flow chart 200 will now be described in conjunction with FIGS. 1 and 3 in order to illustrate one possible operational scheme of the apparatus 100. It is understood that other operational schemes of the apparatus 100 are possible and that the discussion herein of specific steps is not intended to imply the existence of any limitations regarding the functional performance of the apparatus 100 or any other apparatus in accordance with additional embodiments of the instant invention.

It is to be understood that, in the interest of clarity of explanation, only a single given tape cartridge 141 (FIGS. 1 and 3) is considered in the following description of the flow chart 200. That is, although the steps of the flow chart 200 can be applied to an apparatus 100 (FIG. 1) which employs a plurality of tape cartridges 141, only one tape cartridge will be considered in the explanation of the flow chart.

As is seen in FIG. 4, the first step S201 of the flow chart 200 is to begin the process of storing data in accordance with the instant invention. The flow chart 200 moves to the step S203 in accordance with which a set of general data 153 (FIG. 3) is stored, or written to, the length of tape media 143 (FIG. 3) within the tape cartridge 141. The set of general data 153 can be written to the length of tape media 153 by a tape drive 121 (FIG. 1), for example. Also in accordance with step S203, the cartridge identification tag 157 (FIG. 3) is stored in, or written to, the cartridge memory 146 (FIG. 3). Likewise, the cartridge stamp 158 is stored in, or written to, the cartridge memory 146.

Moving to the next step of S205, the cartridge identification tag 157 is read by the reader device 131 for a first time. The cartridge identification tag 157 is then copied to the reader memory 171 to be stored therein. Progressing to step S207, a first reading of the cartridge stamp 158 is performed by the reader device 131. The cartridge stamp 158 is then copied to the reader memory 171 to be stored therein. Similarly, in accordance with the next step of S209, a first reading of the set of label data 156 is performed by the reader device 131. The set of label data 156 is then copied to the reader memory 171 to be stored therein.

Steps S205 through S209 can be performed as the tape cartridge 141 is supported in a respective slot "S" of the support device 161. As is evident, at the completion of step S209, the set of general data 153 is stored on the tape media 143. Also, the set of label data 156 is stored both in the cartridge memory 146 as well as in the reader memory 171. Similarly, both the cartridge stamp 158 and the identification tag 157 are stored in the cartridge memory 146 as well as the reader memory. Additionally, a first reading has been made of the set of label data 156, the cartridge stamp 158, and the identification tag 157.

Now moving to step S211, the tape cartridge 141 is moved from its supported position in the respective slot "S" of the support device 161 to a tape drive 121. The next step of S213 queries whether the tape drive 121 is to read the set of general data 153 or whether the tape drive is to update the set of general data. That is, in accordance with the step S213, the tape drive 121 can retrieve data by reading the set of general data 153, or update the set of general data 153 by writing data to the tape media 143.

If the answer to the query of step S213 is that the tape drive 121 is to write over the set of general data 153, then the flow diagram 200 progresses to step S215 in accordance with which the set of general data is updated. In accordance with the following step S217, the set of label data 156 is updated in response to the updating of the set of general data 153. Moving to the next step of S221, the cartridge stamp 158 is updated. In accordance with the following step S223, the tape cartridge 141 is removed from the tape drive 121 and moved back to its respective slot "S" in the support device 161

If the answer to the query of step S213 is that the tape drive 121 is to read only, then the flow diagram 200 progresses directly from the step S213 to step S219 in accordance with which the set of general data is read by the tape drive 121. From step S219 the flow diagram can progress directly to step S223 (FIG. 5), wherein the tape cartridge is moved from the tape drive 121 to its supported position in the respective slot "S" of the support device 161. In this manner, step S221 is skipped and, thus, the cartridge stamp 158 is not updated if the set of general data 153 is read only. However, as discussed above, the step S221 is performed in the event that the set of general data 153 is updated.

With reference now to FIG. 5, the flow diagram 200 progresses from step S223 to step S225 which is another query. The query of step S225 asks if the tape cartridge 141 is needed at the tape drive 121 for reading or writing, or if the tape cartridge is needed for reading by the reading device 131, or if neither is the case. That is, three possible answers exist for the query of step S225. One answer is that the tape cartridge 141 is needed at the tape drive 121 for reading of, or writing to, the set of general data 153. The second possible answer is that the tape cartridge is needed for reading of the cartridge memory 146 by the reader device 131. The third answer is that the tape cartridge is not needed at all, and thus remains in its supported position in the respective slot "S" of the support device 161.

If the answer to the query of step S225 is that the tape cartridge 141 is needed at the tape drive 121, then the flow diagram 200 goes back to the step S211 (FIG. 4) in accordance with which the tape cartridge is moved from the support device 161 to the tape drive. From step S211, the flow diagram progresses again to step S225 as described above. If the answer to the query of step S225 is that the tape cartridge 141 is not needed at the tape drive 121 or for reading by the reader device 131, then the flow diagram 200 remains in a loop until one of the other two possible answers is achieved.

If the answer to step S225 is that the tape cartridge 141 is needed for reading by the reader device 131, then the flow diagram moves to step S227 in accordance with which a second reading of the identification tag 157 is performed by the reader device. The performance of step S227 allows the second controller 102 to identify the tape cartridge 141. The flow chart then moves to step S229, wherein a second reading of the cartridge stamp 158 from the cartridge memory 146 is performed by the reader device 131.

Moving to step S231, the cartridge stamp 158 from the second reading thereof is compared to the respective cartridge stamp 158 which is stored in the reader memory 171. That is, because the identification tag 157 is read during the second reading of the cartridge memory 146, the second controller can search the reader memory for the matching identification tag stored therein. When the matching identification tag 157 is found in the reader memory 171, the second controller 102 can then compare the respective corresponding cartridge stamps 158 with one another.

The next step S233 is yet another query which asks if the cartridge stamp 158 which is stored in the cartridge memory 146 is different from the respective cartridge stamp 158 which is stored in the reader memory 171. In other words, the query of step S233 asks whether the cartridge stamp 158 has been updated between the first and second reading thereof. If the answer to the query of step S233 is "yes," then the flow chart 200 moves to step S235. In accordance with step S235, the cartridge stamp 158 in the reader memory 171 is replaced with the updated cartridge stamp from the cartridge memory 146. If the answer to the query of step S233 is "no," then the flow chart 200 moves to step S241 in accordance with which the label data 156 is not read from the cartridge memory 146.

From step S235, the flow chart goes to step S237 wherein the set of updated label data 156 is read from the cartridge memory 146. It is noted that an indication of an updated cartridge stamp 158 in response to the query of step S233 is an indication that the label data 156 has been updated. Thus, as the flow chart moves from step S237 to S239, the updated set of label data 156 from the cartridge memory 146 is saved to the reader memory 171.

As is evidenced by the dashed line, the flow chart 200 can lead, both from step S239 and step S241, back to step S225 where the tape cartridge 141 is again made available for the tape drive 121 or for reading by the reader device 131. From step S225, the flow chart proceeds as described above. Alternatively, from both step S239 and step S241, the flow chart 200 proceeds to the last step of S243 which is the end of the flow chart.

In accordance with a second embodiment of the present invention, a method of data storage employing a tape cartridge having a cartridge memory comprises storing a cartridge stamp in the cartridge memory, and determining whether the cartridge stamp has been updated. As discussed above, one way of determining whether the cartridge stamp has been updated is by performing a first reading of the cartridge stamp, then performing a second reading of the cartridge stamp, and then looking for a difference in the cartridge stamp between the first reading and second reading.

The method, in accordance with the second embodiment of the present invention can include storing a set of label data in the cartridge memory, and updating the cartridge stamp. If the cartridge stamp is updated, the method can include determining that the cartridge stamp has, in fact, been updated. The set of label data which is stored in the cartridge memory can then be read in response to determining that the cartridge stamp has been updated.

The method can further include updating the set of label data which is stored in the cartridge memory. The updating of the cartridge stamp is performed in response to the updating of the set of label data. That is, the set of label data is updated and then the cartridge stamp is updated as described above in response to the updating of the set of label data. In accordance with the method, the cartridge stamp can comprise a real-time stamp. Alternatively, the cartridge stamp can comprises a randomly selected character. As yet a further alternative, the cartridge stamp can comprise a sequentially selected character.

A third embodiment of the present invention provides for a method of data storage employing a tape cartridge which has a cartridge memory and a length of tape media. The tape media has a set of general data stored thereon. The method comprises storing a cartridge stamp in the cartridge memory and updating the set of general data. The cartridge stamp is updated in response to updating of the set of general data. The method can also include storing a set of label data in the cartridge memory and updating the set of label data as a result of updating the set of general data.

In accordance with a fourth embodiment of the present invention, a method of data storage employs a tape cartridge which has a cartridge memory with a set of label data stored therein. The tape cartridge also has length of tape media with a set of general data stored thereon. The method comprises storing a cartridge stamp in the cartridge memory and replacing the set of label data stored in the cartridge memory with an updated set of label data. The method also includes replacing the cartridge stamp stored in the cartridge memory with an updated cartridge stamp in response to replacing the set of label data with an updated set of label data.

The method can also include providing a reader memory and storing the cartridge stamp in the reader memory. The updated cartridge stamp can be read from the cartridge memory. The updated cartridge stamp which is stored in the cartridge memory can then be compared with the cartridge stamp stored in the reader memory. A determination can then be made that the updated cartridge stamp that is stored in the cartridge memory does not match the cartridge stamp that is stored in the reader memory. In other words, a finding can be made that the cartridge stamp and the updated cartridge stamp are not the same.

Also in accordance with the method, the set of label data can be read from the cartridge memory in response to determining that the updated cartridge stamp stored in the cartridge memory does not match the cartridge stamp stored in the reader memory. The cartridge stamp in the reader memory can then be replaced with the updated cartridge stamp from the cartridge memory in response to determining that the cartridge stamp in the reader memory does not match the updated cartridge stamp in the cartridge memory.

The method can further include storing the set of label data in the reader memory and replacing the set of label data in the reader memory with the updated set of label data from the cartridge memory. This can be done in response to determining that the updated cartridge stamp stored in the cartridge memory does not match the cartridge stamp stored in the reader memory.

The set of general data which is stored on the length of tape media can be replaced with an updated set of general data. In accordance with the method, the replacement of the set of label data stored in the cartridge memory with a set of updated label data as described above, is done in response to replacing the set of general data with the updated set of general data.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of data storage employing a tape cartridge having a cartridge memory, the method comprising:
    storing a cartridge stamp and a set of label data in the cartridge memory;
    updating the set of label data; and,
    updating the cartridge stamp in response to updating the set of label data.

2. A method of data storage employing a tape cartridge having a cartridge memory, the method comprising:
    storing a cartridge stamp and a set of label data in the cartridge memory;
    updating the set of label data;
    updating the cartridge stamp in response to updating the label data;
    performing a first reading of the cartridge stamp;
    performing a second reading of the cartridge stamp; and,
    looking for a difference in the cartridge stamp between the first reading and the second reading.

3. The method of claim 2, and wherein the cartridge stamp comprises a real-time stamp.

4. The method of claim 2, and wherein the cartridge stamp comprises a randomly selected character.

5. The method of claim 2, and wherein the cartridge stamp comprises a sequentially selected character.

6. A method of data storage employing a tape cartridge having a cartridge memory, the method comprising:
    storing a cartridge stamp and a set of label data in the cartridge memory;
    updating the set of label data;
    updating the cartridge stamp in response to updating the set of label data;
    determining that the set of label data has been updated; and,
    reading the set of label data in response to determining that the cartridge stamp has been updated.

7. A method of data storage employing a tape cartridge which has a length of tape with a set of general data stored thereon, and which has a cartridge memory, the method comprising:
    storing a cartridge stamp and a set of label data in the cartridge memory;
    updating the set of general data; and,
    updating the cartridge stamp and the set of label data as a result of updating the set of general data.

8. A method of data storage employing a tape cartridge which has a cartridge memory with a set of label data stored therein, and which has a length of tape with a set of general data stored thereon, the method comprising:
    storing a cartridge stamp in the cartridge memory;
    replacing the set of label data stored in the cartridge memory with an updated set of label data; and,
    replacing the cartridge stamp stored in the cartridge memory with an updated cartridge stamp in response to replacing the set of label data.

9. The method of claim 8, and further comprising:
    providing a reader memory; and,
    storing the cartridge stamp in the reader memory.

10. A method of data storage employing a tape cartridge which has a cartridge memory with a set of label data stored therein, and which has a length of tape with a set of general data stored thereon, the method comprising:
    storing a cartridge stamp in the cartridge memory;
    replacing the set of label data stored in the cartridge memory with an updated set of label data;
    providing a reader memory;
    storing the cartridge stamp in the reader memory;
    reading the updated cartridge stamp from the cartridge memory;
    comparing the updated cartridge stamp to the cartridge stamp stored in the reader memory; and,
    determining that the updated cartridge stamp stored in the cartridge memory does not match the cartridge stamp stored in the reader memory.

11. The method of claim 10, and further comprising reading the set of label data from the cartridge memory in response to determining that the updated cartridge stamp stored in the cartridge memory does not match the cartridge stamp stored in the reader memory.

12. The method of claim 11, and further comprising replacing the cartridge stamp in the reader memory with the updated cartridge stamp from the cartridge memory in response to determining that the updated cartridge stamp stored in the cartridge memory does not match the cartridge stamp stored in the reader memory.

13. The method of claim 12, and further comprising:
    storing the set of label data in the reader memory; and,
    replacing the set of label data in the reader memory with the updated set of label data in the reader memory in response to determining that the updated cartridge stamp stored in the cartridge memory does not match the cartridge stamp stored in the reader memory.

14. The method of claim 13, and further comprising replacing the set of general data with an updated set of general data, wherein replacing the set of label data stored in the cartridge memory with an updated set of label data is in response to replacing the set of general data with an updated set of general data.

15. A data storage apparatus, comprising:
    a tape cartridge having a cartridge memory configured to store therein a cartridge stamp; and,
    a controller, wherein:
        the cartridge memory is further configured to store therein a set of label data and,
        the controller is configured to execute a sequence of computer-executable steps to:
            update the set of label data; and,
            update the cartridge stamp in response to updating the set of label data.

16. A data storage apparatus, comprising:
    a tape cartridge having a cartridge memory which is configured to store therein a cartridge stamp and a set of label data;
    a first controller configured to execute a sequence of computer-executable steps to:
        update the set of label data; and, update the cartridge stamp in response to updating the set of label data; and, a second controller configured to execute a sequence of computer-executable steps to:

read the cartridge stamp from the cartridge memory during a first reading thereof before the cartridge stamp is updated;

read the updated cartridge stamp from the cartridge memory during a second reading thereof after the cartridge stamp is updated;

compare the cartridge stamp to the updated cartridge stamp; and, determine that the cartridge stamp does not match the updated cartridge stamp.

17. The apparatus of claim 16, and wherein the second controller is configured to execute an additional computer-executable step to read the updated set of label data from the cartridge memory in response to determining that the cartridge stamp does not match the updated cartridge stamp.

18. The apparatus of claim 17, and further comprising a reader memory, and wherein the second controller is configured to execute additional computer-executable steps to:

store the set of label data in the reader memory; and, update the set of label data stored in the reader memory in response to determining that the cartridge stamp does not match the updated cartridge stamp.

* * * * *